US008289563B2

(12) United States Patent
Morales et al.

(10) Patent No.: US 8,289,563 B2
(45) Date of Patent: Oct. 16, 2012

(54) METHOD AND SYSTEM FOR ENABLING PRODUCTION OF LARGER BOOKS UTILIZING HINGED MEDIA

(75) Inventors: Javier A. Morales, Rochester, NY (US); Michael E. Farrell, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 869 days.

(21) Appl. No.: 12/353,160

(22) Filed: Jan. 13, 2009

(65) Prior Publication Data

US 2010/0178133 A1 Jul. 15, 2010

(51) Int. Cl.
*G06F 15/00* (2006.01)
*G06F 3/00* (2006.01)

(52) U.S. Cl. ...................................... 358/1.18; 715/733

(58) Field of Classification Search ................. 358/1.18, 358/1.15

See application file for complete search history.

(56) References Cited

U.S. PATENT DOCUMENTS 4,447,481 A 5/1984 Holmberg et al. .............. 428/40
4,618,520 A 10/1986 Holmberg ..................... 428/131
4,884,826 A 12/1989 Slagsvol ........................... 281/2
5,320,387 A 6/1994 Carlson ........................... 283/75
5,390,354 A 2/1995 De Heus et al. .............. 395/800
5,437,476 A 8/1995 Hutchinson ................... 281/151
5,842,722 A 12/1998 Carlson ......................... 283/107
6,254,085 B1 * 7/2001 Kang ............................ 271/171
7,271,806 B2 9/2007 Everett .......................... 345/471
2007/0091331 A1 * 4/2007 Ohashi ........................... 358/1.2

OTHER PUBLICATIONS

Digital Photo Pages, Flexbind Technology; PMA 2008; www.flexbind.com.

* cited by examiner

*Primary Examiner* — Saeid Ebrahimi Dehkordy

(74) *Attorney, Agent, or Firm* — Kermit D. Lopez; Luiz M. Ortiz; Tuesday A. Kaasch

(57) ABSTRACT

A system and method for enabling production of larger books utilizing a multi-substrate hinged media. A media definition for a specialty media can be enhanced to include information about multiple variants that contain varying sizes of hinge sections related to a specific media and a page assignment rule. The set of hinged media variants can be treated as a single media type and the properties of the media type determine sheet thresholds for each variant. The specific media variants can be assigned to specific document pages based on the page assignment rule. The pages in the center of the book utilize larger hinges to allow the pages to lie flat, while pages at the beginning and end of the book utilize smaller hinges to prevent imaging on the hinge area.

20 Claims, 4 Drawing Sheets

METHOD AND SYSTEM FOR ENABLING PRODUCTION OF LARGER BOOKS UTILIZING HINGED MEDIA

TECHNICAL FIELD

Embodiments are generally related to data-processing systems and methods. Embodiments are also related to binding systems and techniques. In addition, embodiments relate to methods and systems for rendering larger books utilizing a multi-substrate hinged media.

BACKGROUND OF THE INVENTION

Perfect binding can be an ideal solution for books, manuals, magazines and a host of other rendered products due to its attractive combination of versatility and cost-effectiveness. In general, a bookbinding system collects a number of sheets (or pages) into a text body (or book block) that includes a spine and two side hinge areas. The bookbinding system applies an adhesive to the text body spine to bind the sheets together. A cover may be attached to the bound text body by applying an adhesive to the side hinge areas or the spine of the text body or both. As the number of sheets forming a booklet increases, the fold line of the bounded booklet is rounded and bulged, which causes a problem of degradation in appearance and feature of the booklet. A major disadvantage of such typical high volume bindings is that the bound books cannot be opened to lay flat.

Hinged media such as, for example, EverFlat™ media, can be configured as a multi-substrate specialty media that contains a polyester hinge between the binding spine and the remainder of the page. Such media facilitates the production of books that lay much flatter when opened than conventional books. Note that EverFlat™ is a trademark of the Xerox Corporation. EverFlat™ media, for example, with a polyester hinge, can be designed to enable spreads on perfect bound books (whether soft or hard cover) to lie completely flat when opened. This can be achieved because the hinged portion of the media is much more flexible than the paper portion of the media. When the book pages fold, the first and last pages in a book can fold in the outermost portions of the hinge, where the paper portion of the media is under, for example, the polyester. The next set of pages can fold at a place in the hinge closer to the spine since this set of pages has to clear the outermost set of pages.

Each subsequent set of pages can fold closer and closer to the spine until the fold happens on the inner side of the hinge. Additional pages after this will not lie flat since the height from the spine to the top of the already folded pages increases past the height of the hinge when the pages are vertical. Such an approach limits the thickness of books that can be made utilizing hinged media. Hence, the hinge can be made really wide to alleviate this problem, but content imaged on the hinge can show substantial color shifts, so this is not desirable or even acceptable in some cases.

Based on the foregoing, it is believed that a need exists for an improved method and system for enhancing the production of larger books that lay much flatter utilizing the multi-substrate hinged media without manual evaluation and exception programming.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for a method, system and computer-usable medium for rendering larger books utilizing a multi-substrate hinged media.

It is a further aspect of the present invention to provide for an improved method for configuring multiple variants of hinged media that contain varying sizes of hinge sections in order to render larger books.

The aforementioned aspects and other objectives and advantages can now be achieved as described herein. A system and method for enabling production of larger books utilizing multi-substrate hinged media is disclosed. Larger books are capable of being rendered utilizing hinged media via the approach described herein. Note that as utilized herein, the term "multi-substrate hinged media" refers to a specialty media that can be configured to contain a hinge between a binding spine and the rest of a page. The hinge may be configured from, for example, polyester, or another appropriate material. Such media allows the pages in an open book to lie completely flat, rather than bowing or arcing up toward the spine. Other types of hinged media may also be implemented in accordance with varying embodiments.

A media definition for a specialty media can be enhanced to include information about multiple variants related to a specific media and a page assignment rule. The set of hinged media variants can be treated as a single media type and the properties of the media type can be utilized to determine sheet thresholds for each variant. The specific media variants can be assigned to specific document pages based on the page assignment rule. The pages in the center of the book utilize larger hinges to allow the pages to lie flat, while pages at the beginning and end of the book utilize smaller hinges to prevent imaging on the hinge area. The sheet thresholds for each variant can be configured either as a percentage of the book size or by numbers of pages. The page assignment rules can be utilized to determine assignment of specific media variants to pages in the document.

A job can be submitted for rendering and a single media can be specified in the rendering job parameters. A determination can then be made if the media selection is associated with the multiple media variants. If the media selection is associated with the multiple media variants, the page assignment rules can be evaluated to determine the required media variants. A determination can then be made whether all the required media variants are available. If the required media variants are not available, then the system can flag the job as ineligible until all required media variants are concurrently loaded and available. If the required media variants are available, the page assignment rules can be utilized to associate specific media variants with specific pages in the document. Finally, the job can be rendered if all document pages are assigned with a media variant.

The system and approach described herein utilizes the single media definition that includes the rules-based assignment of multiple media to specific document pages. The data driven adjustment of the media definition page ranges as a function of the substrate. Hence, it possible to render thicker books utilizing hinged media such as multi-substrate hinged media without manual evaluation of documents and exception programming. Such an approach can be handled in a DFE that enable use of multiple variants of the multi-substrate hinged media in a manner that can allow production of thicker books.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
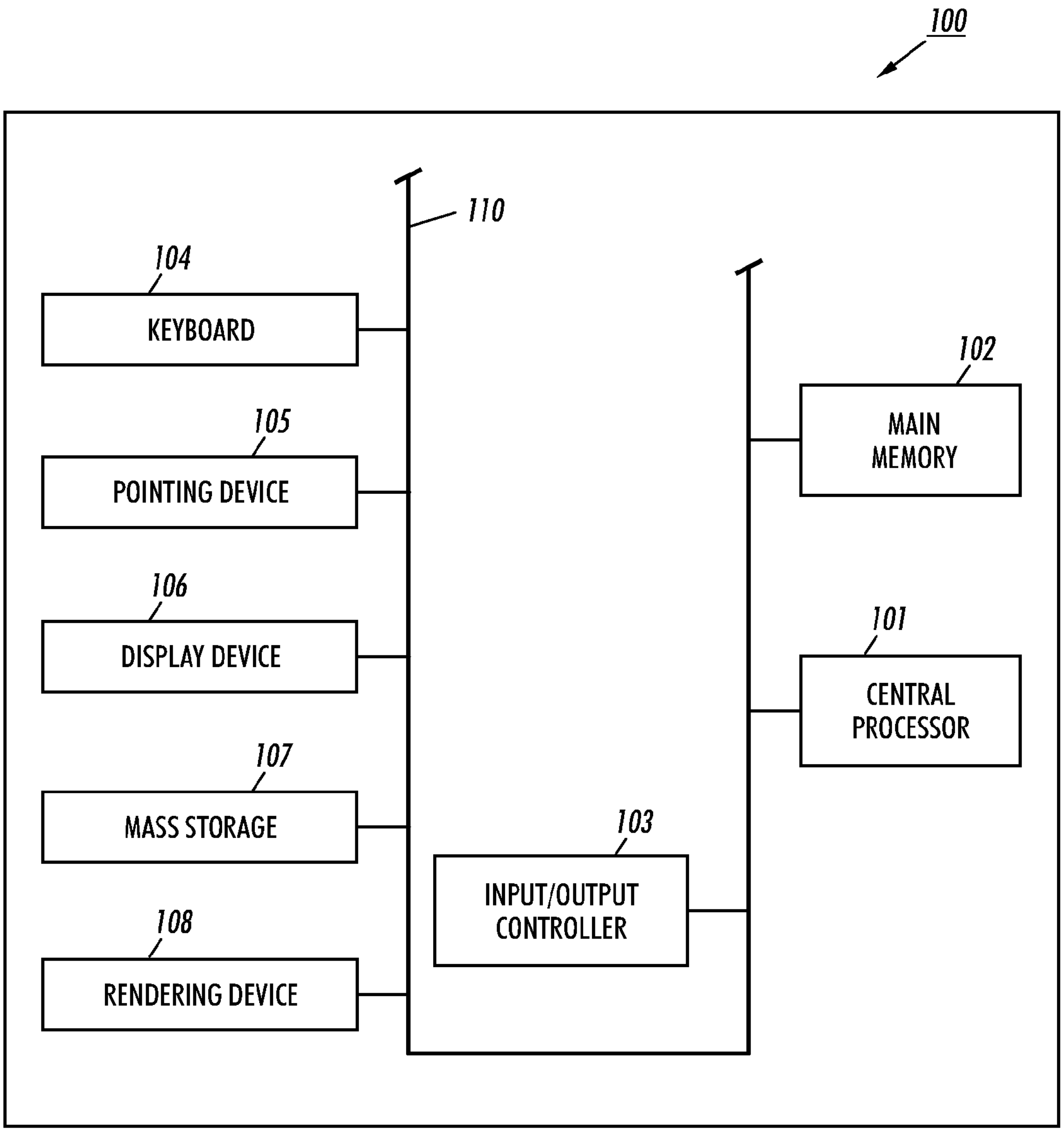
FIG. 1 illustrates a schematic view of a computer system in which the present invention may be embodied.
Figure 2:
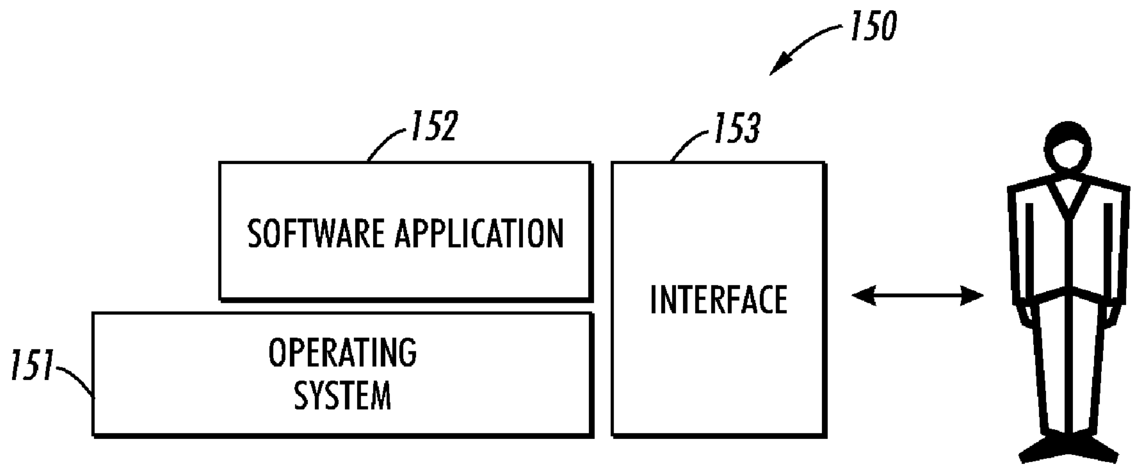
FIG. 2 illustrates a schematic view of a software system including an operating system, application software, and a user interface for carrying out the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied and/or implemented in the context of a data-processing system 100 that generally includes a central processor 101, a main memory 102, an input/output controller 103, an input device such as, for example, a keyboard 104, a pointing device 105 (e.g., mouse, track ball, pen device, or the like), a display device 106, and a mass storage 107 (e.g., hard disk). Additional input/output devices, such as a rendering device 108, may be utilized association with the data-processing system 100 as desired. As illustrated, the various components of the data-processing system 100 communicate through a system bus 110 or similar architecture.

Illustrated in FIG. 2, a computer software system 150 is provided for directing the operation of the data-processing system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing system 100. The data-processing system 100 receives user commands and data through user interlace 153; these inputs may then be acted upon by the data-processing system 100 in accordance with instructions from operating module 151 and/or application module 152.

The interface 153, which is preferably a graphical user interface (GUI), also serves to display results, whereupon the user may supply additional inputs or terminate the session. In one particular embodiment, operating system 151 and interface 153 can be implemented in the context of a "Windows" system. In another embodiment, operating system 151 and interface 153 may be implemented in the context of other operating systems, such as Linux, UNIX, etc. Application module 152, on the other hand, can include instructions such as the various operations described herein with respect to the various components and modules described herein such as, for example, the method 300 depicted in FIG. 3.

The following description is presented with respect to embodiments of the present invention, which can be embodied in the context of a data-processing system such as data-processing system 100 and computer software system 150 depicted respectively in FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 3:
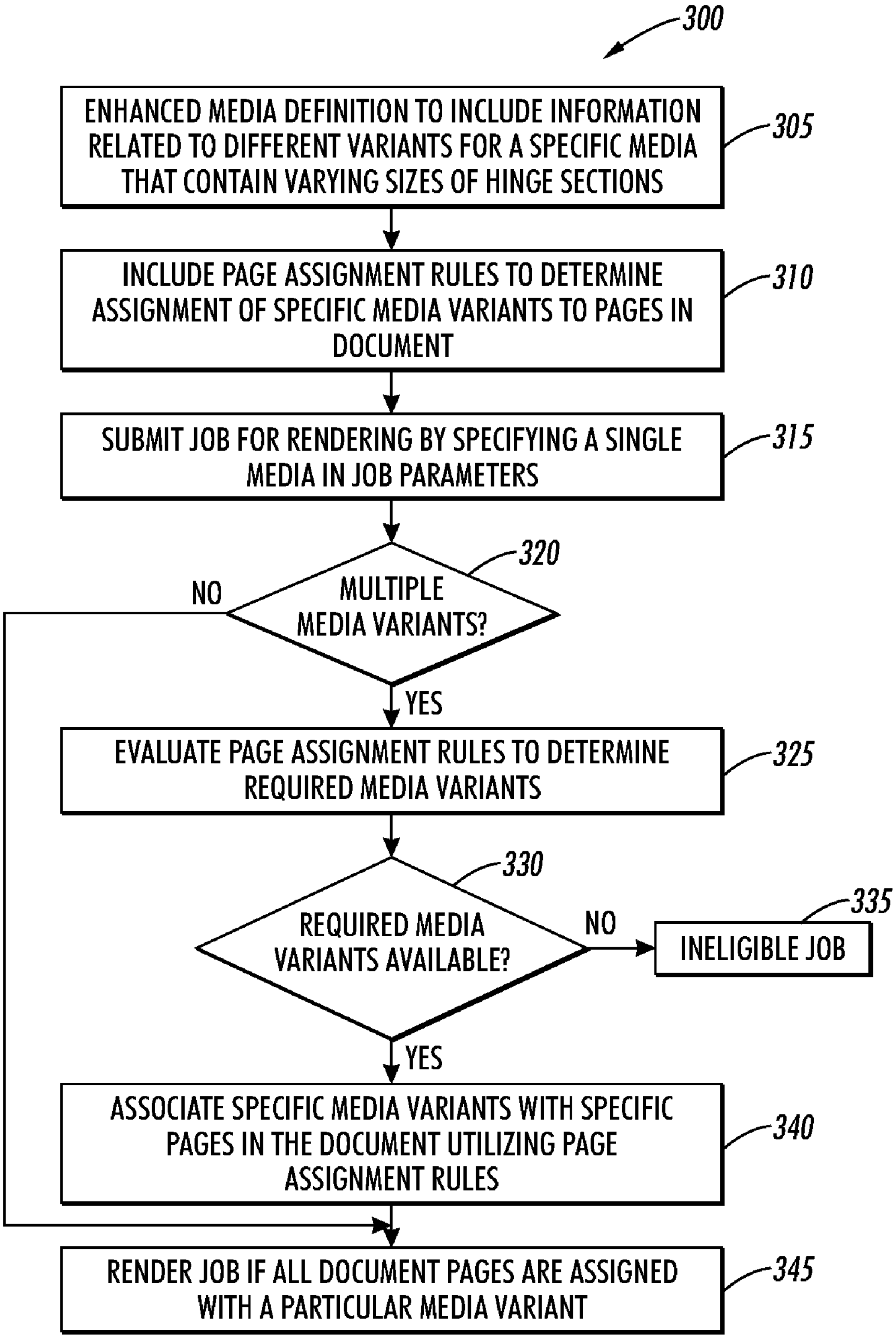
FIG. 3 illustrates a high level flow chart of operations illustrating logical operational steps of a method for enabling production of larger books utilizing a multi-substrate hinged media, in accordance with a preferred embodiment.
Figure 5:
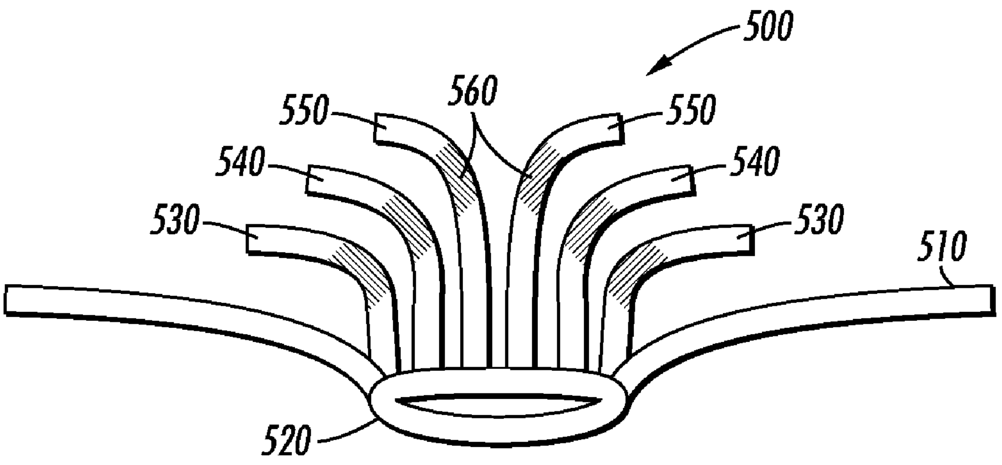
FIG. 5 illustrates an exemplary book layout comprising a book spine utilizing three variants of multi-substrate hinged media, in accordance with a preferred embodiment.

FIG. 3 illustrates a high level flow chart of operations illustrating logical operational steps of a method 300 for enabling production of larger books utilizing a multi-substrate hinged media, in accordance with a preferred embodiment. One example of a multi-substrate hinged media that may be adapted for use in accordance with the present invention is Xerox EverFlat™ media, as described in greater detail herein. Thus, larger books can be rendered utilizing multi-substrate media. Note that as utilized herein, the term "multi-substrate hinged media" can refer to a specialty media that can be configured to contain a hinge area 560, as shown in FIG. 5, between a binding spine area 520 and the rest of the page.

The hinge area 560 may be configured from a material such as, for example, polyester. Such a media allows the pages in an open book to lie completely flat, rather than bowing or arcing up toward the spine. The data-processing system 100 can be configured to function as rendering (e.g., printing) or binding system that is "aware" of production details associated with a rendering job. Note that the method 300 can be implemented in the context of a computer-useable medium that contains a program product. Thus, the method depicted in FIG. 3 can be implemented automatically via instructions stemming from implementation of a particular computer-usable medium. The method 300 depicted in FIG. 3 can be implemented via a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 300 described herein can be deployed as process software in the context of a computer system or data-processing system as that depicted in FIGS. 1-2.

Figure 4:
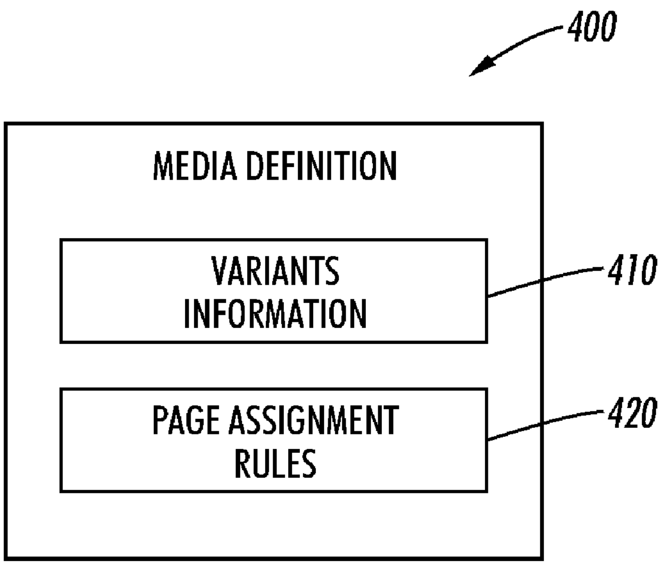
FIG. 4 illustrates a block diagram illustrating data related to a media definition which can be implemented, in accordance with a preferred embodiment.

FIG. 4 illustrates a block diagram illustrating data related to a media definition 400, which can be implemented in accordance with a preferred embodiment. Note that in FIGS. 1-5, identical or similar blocks are generally indicated by identical reference numerals. The media definition 400 generally includes descriptions of the sheet regions that utilize a different substrate or substrate combination. For example, EverFlat™ media can be utilized to specify three regions; one covering the hinge area 560, one covering the polyester and paper regions and one covering the paper region of the sheet. Different variants of hinged media include different sizes of hinge sections. The media definition 400 can be enhanced to include multiple variants information 410 for a specific media that contain varying sizes of hinge sections, as shown at block 305. Thereafter, page assignment rules 420 can also be included to determine assignment of specific media variants to pages in a document, as illustrated at block 310. The multiple related but separate media can be treated as a single media definition. Note that any reference to EverFlat™ media as presented herein is provided for general edification and illustrative purposes only and is not considered a limiting feature of the embodiments. It can be appreciated by those skilled in the art that other types of multi-substrate and/or hinged media may be also be adapted for use in accordance with varying embodiments.

FIG. 5 illustrates an exemplary book layout 500 comprising a book spine 520 utilizing three variants 530, 540 and 550 of multi-substrate hinged media, in accordance with a preferred embodiment. The layout 500 includes a number of sheets that includes the spine area 520 and two side hinge areas 560. The two hinge areas 560 as depicted in FIG. 5, folds back allowing the book 500 to be opened and closed. The spine area 520 is the bound edge of the book where the pages are sewn, glued, or otherwise fastened together. Spines are usually thin and flexible, allowing the book to be easily opened. The width of the spine area 520 determines the number of pages to be bound, for paper of a given weight. A cover 510 can be attached to the book layout 500 by applying an adhesive to the side hinge areas 560 or the spine area 520, or both.

The hinged media can be provided as multi-substrate specialty media with the hinge area 560 designed to enable crossover pages on perfect bound books (whether soft or hard cover) to lie completely flat when opened. The hinge area 560 of the media is much more flexible than the paper portion of the hinged media.

A job can be submitted for rendering by specifying a single media in job parameters, as depicted at block 315. Thereafter, as indicated at block 320, a test can be automatically performed to determine if the media selection is associated with the multiple media variants 410. If the media selection is associated with the multiple media variants 410, the page assignment rules 420 can be evaluated to determine the required media variants, as illustrated thereafter at block 325. Otherwise, the job can be rendered. For example, a 20-page photo book may only require one multi-substrate hinged media variant and a 40-page book may require two media variants.

The hinged media can be implemented from three different variants such as 530, 540 and 550, as depicted in FIG. 5. The variants 530, 540 and 550 differ only with respect to the distance from the spine area 520 to the hinge area 560. The first variant 530 can be utilized for documents with 30 sheets or less, the second variant 540 can be utilized for documents with 31-60 sheets and the third variant 550 can be utilized for documents with 61-90 sheets. Hinged media is available with different substrate calipers such as, for example, 80 lb cover stock and 100 lb Text, depending upon design considerations and goals. The difference in substrate caliper can cause the page range values for each variant to be unique (e.g., a thin substrate can possess a greater value than a thick substrate).

As depicted at block 330, a test can be performed to determine whether all the required media variants are available. If the required media variants are not available, then the job can be flagged as ineligible until all required media variants are concurrently loaded and available, as illustrated at block 335. If the required media variants are available, the page assignment rules 420 can be utilized to associate specific media variants with specific pages in the rendering job, as described at block 340.

Note that the multiple variants of hinged media include varying sizes of hinge sections. For example, for EverFlat™ media, the number of required sheets can be examined to ensure that it is less than 90 since there are only three variants of the described hinged media. The first variant 530 can be assigned to the pages that can be imaged in the first and last 15 sheets of the rendering job. If there are pages left, the second variant 540 can be assigned to, for example, the next 15 sheets from the front and back of the rendering job. If there are still unassigned pages in the rendering job, the assignment with the third media variant 550 can be repeated. Finally, the job can be rendered once all pages related to the rendering job are assigned with a media variant, as shown at block 345. The job can be rendered to create the desired content of the book layout 500 consisting of text and images, utilizing the rendering device 108. The pages can be bounded together utilizing flexible adhesive.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The book 500 can be bound utilizing conventional binding methods such as case binding or perfect binding, the media lies flat allowing the entire page contents to be easily read. The ability of the pages to lay flat in the vicinity of the gutter makes this product more suitable for rendering crossover pages.

The specific variants of the media can be assigned to specific pages related to the rendering job based on predefined rules. The set of hinged media variants can be treated as a single media type and the properties of the media type determine the sheet thresholds for each variant, either as a percentage of the book size or by numbers of pages. The pages in the center of the book 500 utilize larger hinges to allow them to lie flat, while pages at the beginning and end of the book 500 utilize smaller hinges to prevent imaging on the hinge area.

The system and approach described herein utilizes the single media definition 400 that includes the rules-based assignment of multiple media to specific document pages. The data driven adjustment of the media definition page ranges as a function of the substrate. Hence, it is possible to render thicker books utilizing hinged media such as multi-substrate hinged media without manual evaluation of documents and exception programming. Such an approach can be handled in a DFE (digital front end) that enable use of multiple variants of the multi-substrate hinged media in a manner that can allow production of thicker books.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for enabling production of larger books utilizing a multi-substrate hinged media, said method comprising:

incorporating information related to a plurality of media variants with respect to a multi-substrate hinged media and a page assignment rule in the context of a media definition, wherein said plurality of media variants comprise sizes of at least one hinge section contained in said multi-substrate hinged media;

evaluating said page assignment rule to determine said plurality of media variants required for a rendering job in order to thereafter associate said plurality of media variants of said multi-substrate hinged media with specific pages associated with said rendering job utilizing said page assignment rule; and rendering said job on said multi-substrate hinged media, if all pages related to said rendering job are assigned to a media variant, thereby enhancing the production of larger books utilizing said multi-substrate hinged media.

2. The method of claim 1 further comprising:

configuring said plurality of media variants as a single media type; and determining sheet thresholds with respect to each media variant utilizing properties associated with said media type.

3. The method of claim 1 further comprising specifying a single media type in association with job parameters related to said rendering job.

4. The method of claim 2 further comprising determining if said single media type is associated with said plurality of media variants with respect to said multi-substrate hinged media.

5. The method of claim 1 further comprising determining an availability of said plurality of media variants required for rendering said job.

6. The method of claim 1 further comprising configuring said hinge section associated with said multi-substrate hinged media between a binding spine and a remainder of a page, in order to allow said pages in a book to lie substantially flat when opened.

7. The method of claim 1 further comprising:

configuring said plurality of media variants as a single media type;

determining sheet thresholds with respect to each media variant utilizing properties associated with said media type; and specifying a single media type in association with job parameters related to said rendering job.

8. The method of claim 1 further comprising:

configuring said hinge section associated with said multi-substrate hinged media between a binding spine and a remainder of a page, in order to allow said pages in a book to lie substantially flat when opened.

9. A method for enabling production of larger books utilizing a multi-substrate hinged media, said method comprising:

incorporating information related to a plurality of media variants with respect to a multi-substrate hinged media and a page assignment rule in the context of a media definition, wherein said plurality of media variants comprise sizes of at least one hinge section contained in said multi-substrate hinged media;

evaluating said page assignment rule to determine said plurality of media variants required for a rendering job in order to thereafter associate said plurality of media variants of said multi-substrate hinged media with specific pages associated with said rendering job utilizing said page assignment rule;

rendering said job on said multi-substrate hinged media, if all pages related to said rendering job are assigned to a media variant, thereby enhancing the production of larger books utilizing said multi-substrate hinged media;

configuring said plurality of media variants as a single media type; and determining sheet thresholds with respect to each media variant utilizing properties associated with said media type.

10. The method of claim 9 further comprising specifying said single media type in association with job parameters related to said rendering job.

11. The method of claim 9 further comprising determining if said single media is associated with said plurality of media variants with respect to said multi-substrate hinged media.

12. The method of claim 9 further comprising determining an availability of said plurality of media variants required for rendering said job.

13. The method of claim 9 further comprising configuring said hinge section associated with said multi-substrate hinged media between a binding spine and the rest of a page in order to allow said pages in a book to lie substantially flat when opened.

14. A system for enabling production of larger books utilizing a multi-substrate hinged media, said system comprising:

a processor;

a data bus coupled to said processor; and a computer-usable medium embodying computer code, said computer-usable medium being coupled to said data bus, said computer program code comprising instructions executable by said processor and configured for:

incorporating information related to a plurality of media variants with respect to a multi-substrate hinged media and a page assignment rule in the context of a media definition, wherein said plurality of media variants comprise sizes of at least one hinge section contained in said multi-substrate hinged media;

evaluating said page assignment rule to determine said plurality of media variants required for a rendering job in order to thereafter associate said plurality of media variants of said multi-substrate hinged media with specific pages associated with said rendering job utilizing said page assignment rule; and rendering said job on said multi-substrate hinged media, if all pages related to said rendering job are assigned to a media variant, thereby enhancing the production of larger books utilizing said multi-substrate hinged media.

15. The system of claim 14 wherein said instructions are further configured for:

configuring said plurality of media variants as a single media type; and determining sheet thresholds with respect to each media variant utilizing properties associated with said media type.

16. The system of claim 14 wherein said instructions are further configured for specifying a single media type in association with job parameters related to said rendering job.

17. The system of claim 15 wherein said instructions are further configured for determining if said single media type is associated with said plurality of media variants with respect to said multi-substrate hinged media.

18. The system of claim 14 wherein said instructions are further configured for determining an availability of said plurality of media variants required for rendering said job.

19. The system of claim 14 wherein said instructions are further configured for configuring said hinge section associated with said multi-substrate hinged media between a binding spine and a remainder of a page in order to allow said pages in a book to lie substantially flat when opened.

20. The system of claim 14 wherein said instructions are further configured for:

configuring said plurality of media variants as a single media type; determining sheet thresholds with respect to each media variant utilizing properties associated with said media type; and specifying a single media type in association with job parameters related to said rendering job.

* * * * *